United States Patent
Yachnes

(10) Patent No.: US 11,335,206 B2
(45) Date of Patent: May 17, 2022

(54) CLASSROOM EDUCATIONAL RESPONSE SYSTEM AND PEDAGOGICAL METHOD

(71) Applicant: Nissim Yisroel Yachnes, Brooklyn, NY (US)

(72) Inventor: Nissim Yisroel Yachnes, Brooklyn, NY (US)

( * ) Notice: Subject to any disclaimer, the term of this patent is extended or adjusted under 35 U.S.C. 154(b) by 464 days.

(21) Appl. No.: 16/291,748

(22) Filed: Mar. 4, 2019

(65) Prior Publication Data
US 2019/0272763 A1  Sep. 5, 2019

Related U.S. Application Data

(60) Provisional application No. 62/637,878, filed on Mar. 2, 2018.

(51) Int. Cl.
| | |
|---|---|
| G09B 7/00 | (2006.01) |
| F21S 9/02 | (2006.01) |
| F21V 23/06 | (2006.01) |
| A47B 41/00 | (2006.01) |
| G08B 5/36 | (2006.01) |
| F21V 23/04 | (2006.01) |
| G09B 7/07 | (2006.01) |

(52) U.S. Cl.
CPC ............... *G09B 7/00* (2013.01); *A47B 41/00* (2013.01); *F21S 9/02* (2013.01); *F21V 23/04* (2013.01); *F21V 23/06* (2013.01); *G08B 5/36* (2013.01); *G09B 7/07* (2013.01); *A47B 2220/0075* (2013.01)

(58) Field of Classification Search
None
See application file for complete search history.

(56) References Cited

U.S. PATENT DOCUMENTS

| | | | | |
|---|---|---|---|---|
| 3,190,014 A | * | 6/1965 | Rhodes | G09B 7/073 434/350 |
| 3,401,469 A | | 9/1968 | Shaver et al. | |
| 5,823,788 A | * | 10/1998 | Lemelson | G09B 7/04 434/350 |
| 8,188,878 B2 | | 5/2012 | Pederson et al. | |
| 8,436,542 B2 | | 5/2013 | Middleton-White et al. | |
| 2010/0235854 A1 | * | 9/2010 | Badgett | G09B 7/00 725/24 |

(Continued)

OTHER PUBLICATIONS

Screen captures from YouTube video clip entitled "Acer | TeachSmart—Engaging Young Minds," published by Acer, 6 pages, uploaded on Oct. 23, 2016 by user Acer. Retrieved from Internet: <https://www.youtube.com/watch?v=6c932NZ8w9k> (Year: 2016).*

(Continued)

*Primary Examiner* — Robert J Utama
*Assistant Examiner* — Correll T French
(74) *Attorney, Agent, or Firm* — Bycer & Marion PLC; Matthew L. Bycer; Michael B. Marion

(57) ABSTRACT

A colored lighting system with a scheme to indicate the nature of a student's participation action. Students are outfitted with desktop-mounted lights, preferably capable of emitting numerous colors in a serial fashion. The teacher can then read the indicated color pattern, or light from an individual student, and select whether to interrupt and in what order to address each student. The method may be used for lecture, testing, in-class projects, and beyond.

20 Claims, 6 Drawing Sheets

(56) References Cited

U.S. PATENT DOCUMENTS

2013/0084555 A1* 4/2013 Kaneko .................. G09B 5/067
434/362

OTHER PUBLICATIONS

Acer, Acer Travel Mate B1 Touch User Manual, revised Dec. 2016, published by Acer, pp. 34-42 (Year: 2016).*
United kingdom: Acer empowers education with the game-changing TravelMate B117. (2016). MENA Report, , n/a. Retrieved from https://dialog.proquest.com/professional/docview/1758833825?accountid=131444 (Year: 2016).*
Acer Unveils Versatile and Robust TravelMate Spin B1 Convertible Notebook at BETT 2017. (2017). Syndicate Media Inc, , n/a. Retrieved from https://dialog.proquest.com/professional/docview/1860920095?accountid=131444 (Year: 2017).*

* cited by examiner

CLASSROOM EDUCATIONAL RESPONSE SYSTEM AND PEDAGOGICAL METHOD

CLAIM OF PRIORITY

The present application includes subject matter disclosed in and claims priority to a provisional application entitled "Classroom Educational System and Method" filed Mar. 2, 2018 and assigned Ser. No. 62/637,878, describing an invention made by the present inventor, herein incorporated by reference.

BACKGROUND OF THE INVENTION

1. Field of the Invention

The present invention relates to classroom educational systems. The present invention more particularly relates to a pedagogical device and communication method for a teacher driven classroom.

2. Description of Related Prior Art

Historically, educational systems relied heavily on classroom dissemination of knowledge. The typical classroom included a multitude of students arrayed and sitting facing in a singular direction, with a teacher or teachers set in the front of the classroom. Oftentimes, the teacher's presentation includes the support of certain teachers aides, such as a chalkboard/whiteboard, pointers, projectors, and more recently, advanced audiovisual demonstration devices. One aspect of the standard classroom is the benefit of placing a single teacher in front of multiple students in an interactive setting. While it is common for the teacher to lecture in a one-way communication transfer from teacher to students, the interactive space of the classroom allows for dialogue between one teacher and one or more students. Particularly with regard to child and elementary education, it is important for the teacher to maintain behavioral control over all student participants.

To this end, the teacher may have specific parochial responsibilities for the children, and otherwise control aspects of the classroom beyond purely the educational material. For instance, while a teacher may be disseminating knowledge, fielding questions, or otherwise discussing pertinent material, auxiliary, related, and unrelated material is often brought to the attention of the teacher. As an example, a student may interrupt the teacher to ask to be excused to attend to a restroom, or otherwise leave the classroom. Students may also wish to interrupt a lecture to request scheduling, or particularly disrupt the environment. In some instances, a malicious motive may inspire a student to disrupt the classroom with a joke, or otherwise. Should such student succeed in interrupting the lecture, or otherwise distracting the teacher, the educational environment of all the students suffers.

While numerous devices have been developed and used to facilitate interactivity with teachers, for instance push-button notifications to answer multiple choice questions, etc., these classroom response clickers have limited interactivity, often forcing the teacher to prepare multiple choice questions ahead of the class period, with little other flexibility (beyond attendance). Other systems have been devised for remote/video lectures. The present invention relates to a device enabling a multitude of communication means for the teacher in a classroom that is easy to use and focuses on student comprehension.

It is therefore a primary object of the present invention to provide a communication device to allow a participant to communicate with a lead person.

It is a further object of the present invention to provide a system of devices enabling each student participant to communicate a specific category of messages to a teacher.

It is as yet a further object of the present invention to provide a method of pedagogy wherein a lecturer may interact with student participants via a signaling communication system.

It is a further object of the present invention to provide a method of teaching whereby a teacher may selectively call on one or more students in a serial or parallel fashion in order to enhance, or otherwise minimize disruption, of an educational lesson.

These and other objects of the present invention will become apparent to those skilled in the art as the description thereof proceeds.

SUMMARY OF THE INVENTION

The present invention is directed to an interactive classroom communication device that can be mounted on a desktop surface. The device is preferably a light unit with a light emitter adapted to display multiple light colors. The light unit may be programmed, or controlled by a student to select an appropriate light color based on the current scheme and the nature of the student action. The desktop surface may include an indentation, or landing point, on which the light unit may be placed into and stationed on the desk. The surface may be circular so as to allow the student to easily place, or may include a notch, or other imperfection which forces the orientation of the light unit to ensure a front facing side (with display) and a rear (potentially for control buttons). The light emitter may be outfitted with a dome, the dome may function as an off-switch. By holding the light button, a student may select to blink the light.

The light unit may directly plug into a port on the desktop fitted to power the unit. Inductive charging/power may be employed through the desktop. Otherwise, the unit may include a battery or power storage that can be charged on the desk, or may be set into charging stations in the classroom, or charged with a separate, potentially portable, unit.

The unit may include a memory system to store information regarding the frequency and color choices of the student. The unit may also include a display to demonstrate the number of each color selection to the student.

A complementary receiver may be employed, possibly as part of a display clock, or otherwise, and preferably on the wall, or another high station capable of receiving signals transmitted from the student-based light units. The data can then be transponded, or sent, on to a central processor for analysis. The analyzed data may be transmitted and displayed in real-time on a teacher display.

The present invention also includes a method of operating a classroom with students and a managerial leader, proctor, or teacher. A teacher addresses the students either orally and/or visually, and preferably in front of the class. Students respond with a light-based communication device, the color of the light indicating the nature of the student response or action. The light units may be mounted on the student desks, or may be set as a paddle, ring, band, or otherwise set for view by teacher.

Information for each device may be recorded, including the nature and frequency of action. The device may send a signal to a central receiver positioned in the classroom, said central receiver receiving signals from multiple light-based communication devices and separately storing data for each of the light-based communication devices. Alternatively, a recorder may simply record the light and video in the room, associate each light-up with a specific unit, and record same, without requiring any signal, beyond the indicator light to be sent to the central receiver.

As an example of a scheme useful with this method, a teacher may propose a query to the classroom, and one or more students may indicate a response by selection of one of four separate colors on a light-based communication device. The students may each either light up their light-based communication device or leave it off. A first color indicates a request for clarification, a second color indicates a response to the question, and a third color indicates an irrelevant interjection. Each unit may issue a signal indicating both the specific unit identity and the nature and frequency of specific light selections. The unit may transmit such information to a central receiver. The central receiver may receive and store data from one or more light-based communication devices. The data may then be processed from one or more light based communication devices to provide information. This information may be transmitted to a teacher terminal and displaying same on the teacher terminal.

BRIEF DESCRIPTION OF THE DRAWINGS

The present invention will be described with greater specificity and clarity with reference to the following drawings, in which.

DETAILED DESCRIPTION OF THE PREFERRED EMBODIMENTS

Figure 1:
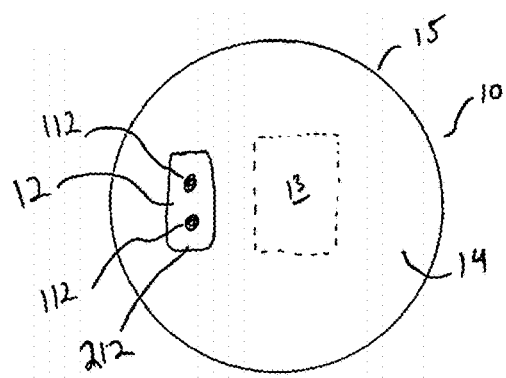
FIG. 1 illustrates an underside of a lighting unit of an embodiment of the present invention.

The present invention is directed to an educational tool that ensures classroom order through students using various multi-colored desk-lights to ask, answer, or request something. The tool serves a secondary function as a behavioral data-collecting system. A multicolored display system assigned to each student, or group of students, allows a teacher to see the type of each student's request—enabling for a smoother classroom session and more control for the teacher. When a specific indicator light is shown, the teacher may use a selection process for picking a specific student that enables management of a smooth education course. The teacher may anticipate and set specific student interruptions to better mold the classroom lecture in a less disruptive fashion. In fact, the system may even help manage and enhance the experience for all students. Teacher can call on students, where students are chosen according to which student has the most relevant request/comment.

Another aspect of the present invention is the enhancement of the behavioral control over the students. While the student can indicate a need/desire to interrupt, the system does not provide instant gratification, and teaches patience. Students with irrelevant questions may be delayed for call on, as the teacher knows not to choose this student first when another student may tack on a complementary comment/question that further fleshes out the subject matter for the entire class. Without this system, a teacher may accidentally pick on a student that has an irrelevant response to a question. This effectively tells the student-body that a student interrupting class is gratified, rather than a student that has a relevant, class-contributing answer. Altogether, this lends to a pedagogical environment and process focused on student engagement and, even more so, comprehension.

Data on student participation can be built based on use of the tool. Students without much participation can be noted, and corrective action may be taken (such as poor grade, or cold calling, etc.). Students can be penalized for mischaracterizing their requests, and such errors can also be logged.

The present invention also includes the method of managing a classroom with multiple participants. A four-part lighting system is envisioned (while the invention may not be limited to less than four, or greater than four light types). Subcategories may also be used. The specific colors for a coding system are described for illustrative purposes, and the significance of each color is described below.

A Blue Light—Intended for material comprehension or clarification, such as use by a student seeking to be engaged with education. This light may also be used for a student to ask an original question—enhancing the classroom discussion. A student using the blue light may ask for a portion of the material to be repeated or for repetition of a recently asked question by another student (for instance in a louder voice). A teacher may use this to call on a student immediately before moving onto a new subject or sentence so as to facilitate a smooth knowledge transfer experience. Data collected may represent a 'challenge' to the student using this light.

A Green Light—Used when awaiting to be called on to participate and contribute to class. This light is intended for use by a student seeking to answer a question presented by the educator. Alternatively, it could be used by a student that wishes to ask a lesson-related question. For example, a valid use for this light would be the question, "May I lead the discussion?" Another use could be to indicate completing in-class assignments. Data collected from this light may represent, at the very least, that the student is or wishes to contribute to the class.

A White Light—Intended for an irrelevant question or request, but pertaining to class. This light is intended for use by a student to ask a question relating to the structure of class, or about a date for an assignment. In other words, the question does not relate to material, rather about some other aspect to do with class. An example of this would be a student asking, "When is the next test scheduled?" during a lecture where class material is being presented. Data collected reflects that general questions are secondary to material questions and understanding.

A Red Light—Used when student exhibits disruptive or negligent behavior, or asks an irresponsible question or request. This light is intended to be initiated by the student themselves. This light is intended for use by a student that has a question/request that negatively interrupts either the educator, student body, or himself. This light is also used when the student leaves the room for any reason. An example includes borrowing supplies—this is on par with not being properly prepared. Being unprepared as decided by the instructor warrants usage of this light. Data collected may represent negative behavior to the student whose light is red.

While color coding described above is illustrative of the invention, the particular colors and categories are subject to modification given the format of the class and activity.

For instance, alternative strategies for use of the lighting tool include starting a class with all lights lit up Blue. Similarly, possession of the textbook can be similarly indicated. A missing light will be immediately noticed. As the lesson progresses, should a student believe they understand the topic, they can modify their light tool to Green to indicate comprehension. This allows the teacher to gauge the rate of intellectual uptake of the class and avoid belaboring or redundant coverage. In addition, should a student not succumb to peer pressure, the teacher can address one or more particular student who remain Blue to directly address their difficulty. This method reverses the process of interruption to indicate comprehension and forces engagement. Additionally, should the student feel a point was misunderstood; the student can change to Red, etc.

For in-class reading assignments, the teacher can set a schedule for lighting that allows the students to indicate to the teacher progression through the material. For instance, when the first page or abstract is begun, students can set their light to White. When onto introduction or page 2, the students can change to Red. When on the third page or topical section, they can change to Green, and at conclusion to Blue. Teacher can gauge the progression through the lesson in this manner. The lighting schedule is mapped to the project or reading assignment (article, etc.) and acts as a real-time indicator. Fewer lighting systems can be used, and a light may be used to indicate completion.

In another embodiment, the lighting tools can be used for votes, e.g. Green for yes and Red for no, or to answer multiple choice inquiries. A board can be placed at front of class to indicate color mapping.

An alternative method of using the lighting schemes is to set a time period in which colors during a lecture have alternative meaning. As such, an initial period of time, e.g. five minutes, can be set to lecture, wherein the white light may be used to interrupt with a general question or contribution to the lecture based on the student's own knowledge and experience. A timer may be placed in front of the class to show the transition from one period to another, and the timer/board may indicate the lighting schemes for interaction. The timer board may also be set on remote, wherein teacher can remotely activate period changes. The teacher may also have a light tool on the front desk to accommodate signaling of schema. Alternatively, during tests, a set time period may include a first time (e.g. ten minutes) with no interruption, and thereafter questions will be welcome.

The system provides a sophisticated system and method to gather and store student data. It is contemplated, in a preferred embodiment, that a greater system is completed wherein data collection is provided by each of the tool lights as nodes, with one or more teacher module (such as a wall mounted or desk mounted clock unit) acting as a gateway, to an off-site cloud provided computing processor. Each action initiated by the lights tools provides a new source of data to the system. For instance, initiating the light each day indicates attendance for a specific student. Each action initiated by the student, whether it be coded by color, associated with a specific time period, or otherwise, is included in the data transfer. The teacher module, or central unit, in each classroom, collects data from each of the unit tool lights, stores the same, and transmits elsewhere to the cloud. It is preferred that the teacher unit be mounted on the wall, preferably at a high location at the front of the room so as not to block any wireless signals (such as radio frequency, etc.) emitted or responding in each of the light units. In some embodiments, the teacher unit includes a light tool on the front desk, wherein the central clock mimics the color or other display on the teacher's light unit. One purpose for mounting the clock unit onto the wall is to provide for a hardwiring, or otherwise constant power source for the primary receiver. Each class will be equipped with at least one receiver, memory, processor that can record questions and each student's responsive light action. Furthermore, each light unit may include a counter to indicate to the student how many times each of the colors had been initiated. Preferably, the underside of each light unit includes a liquid crystal display (LCD) with four lines each indicating a specific numeral for each of the colors. In this manner, the students can themselves keep score of their own engagement. Such data is preferably also stored at the teacher unit for all of the participating light units (i.e., students), as well as transmitted to a central processing unit for composition and reporting to the teacher and/or supervisors.

Data will be stored locally and remotely. The data will be analyzed to determine student-specific, classroom-specific, and teacher-specific achievements. It will allow the teacher and/or supervisor to help mold the classroom and enhance the experience for the students. Given that the system is primarily interested in student comprehension, such data as to specific color feedback in certain time periods is most important. The server acts as a receiver, whereas it is contemplated that each unit will have an onboard memory such as flash memory with a wireless communicator locked into and specified directly to the classroom clock. On a daily, weekly, and semester basis, information regarding classroom engagement will be processed (e.g., graphed per student, per topic, etc.) and submitted to the teacher. The same information can be uploaded into a learning management software system and provide reports to specific students' parents or other guardian. Additionally, it is preferred that the teacher be outfitted with a monitor to display live information on the classroom engagement and participation.

Alternative modes for indicating student engagement may include blinking lights as well as solid lights. For instance, should a student hold down the light indicator, for example five seconds, the system allows for doubling the number of indicators. Such as solid of each color (4), and blinking of each color (4), would allow eight (8) different indications. Additionally, it is preferred that while buttons may be used on the light tools to indicate a light color, a tap on top of the light may be used as a means to turn off the light altogether. A touch display or haptic response system may be included on the top and/or the side or other panel of the light unit. As an alternative embodiment of the present invention, the light tools may be provided as a handheld unit, such as a ring, bracelet, or handheld paddle, that can be triggered to light up in one of many (preferably four) colors so that when students raise their hands, they can indicate to the teacher the nature of their interruption/participation action.

The present invention is also directed to the tool and system for enabling the present educational model. Each student location, or desk, may be outfitted with a signaling device. The device will include a lighting communication system with numerous colors or other indication methods.

Power: The tool may be securely plugged into a port on or near the desk. The tool may be inductively charged or inductively powered when placed over a charging pad either placed, or integrated into the desk. When powered, the system will include a power indicator. Preferably the power indicator is separate from the lighting communication system to be used, however a standard stand-by indicator may be preferred to ensure that teacher sees all students' presence. The presence (and connection) of each tool may indicate presence of the student in the class. Additionally, each tool may be outfitted with a student indictor identifier, such as RFID, or other wireless, or wired digital signal, to indicate attendance.

Alternatively, the tool may be battery operated. The system may used replaceable batteries, or use rechargeable lithium-ion batteries. A third method includes having rechargeable bases, wherein each base detaches from the light. On the underside there are metal contacts that engage with the charging station, allowing it to charge. Each student may be assigned to one, or share, their battery-base to the charging station in the classroom when the school-day is done, allowing them to charge overnight. The next morning, the student selects a base to bring to his/her desk for usage throughout the day. This charging station option would be the most cost-effective method in terms of powering the devices over their lifetime.

Functionality: in one embodiment of the present invention, the goal is to be able to select one-of-four available colored lights for usage. One possibility is to have a switch on the side of a tool with four possible positions. Each switch position would correspond to closing one-of-four parallel circuits, each of which have a different colored LED in series, on the way to ground. Due to the four circuits, this may be cumbersome. The solution could take only one module or dial. Alternatively, the colors may use touch-based interactive graphical user interface (GUI) that allows the student to select either on the tool, or a connected panel, pad, or even the desk surface.

Figure 10B:
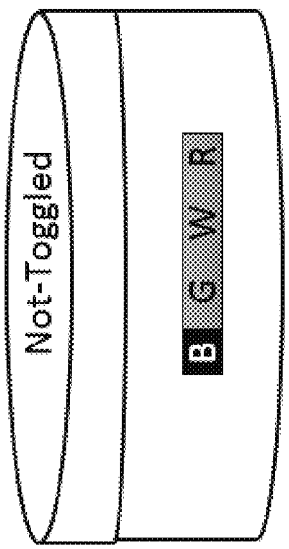
FIG. 10B demonstrates a toggle switch of an embodiment of the present invention in OFF position.
Figure 10A:
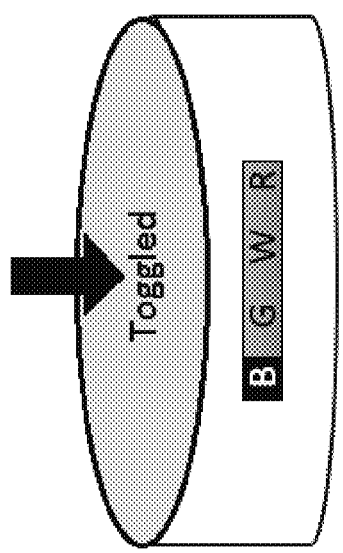
FIG. 10A demonstrates a toggle switch of an embodiment of the present invention in ON position.

Another possibility still uses a four position switch to select colors. The tool may have a variable Red-Green-Blue (RGB) light emitting diode (LED) used with a microcontroller, which may allow for a more compact design. The specific colors desired could be coded into an Arduino board for example, where the R, G and B values are predetermined. For example, when the switch selects green, a specific RGB value is shown. In this situation, it is possible to have the light cover itself be a toggle switch. As can be seen in FIGS. 10A and 10B, the switch may be in an ON position (FIG. 10A) whereby the switch is depressed and the top is lit. The switch may be toggled to an OFF position (FIG. 10B) by repeating the pressure to relieve the switch. Pressing the toggle-top enables the RGB LED circuit to register with the battery-base, giving the tool power.

Secure device to desk: There are different options as to how a tool may stay attached to/in place on the desk. It is important for this device to be fastened or held in place to the desk to prevent breakage or otherwise secure the location for viewing and use. One option is to use an adhesive strip on the desk. If using detachable battery-bases embodiment, than adhesive cannot be placed on the device itself.

Another option is to use VELCRO® strips on each desk, and have hook and/or loop placed in an indent in the underside of the base with the complement located on the underside of the tool. A third option is to use an indentation in the desk surface, deep enough that the tool is secured in place due to gravity, yet shallow enough that the switch and indicator light(s) would be accessible and visible.

Referring now to the figures demonstrating the lighting unit of the present invention. FIG. 1 demonstrates the lower side of lighting unit 10. Underside 14 is shown with edge 15 therearound. While edge 15 is shown in a round circular fashion, it may be appropriate to include additional features, and/or other shapes, such as square, triangle, trapezoid, etc., in order to ensure proper orientation of lighting unit on desk (so that light shows forward, while on-unit indicators and buttons are directed towards student). As shown here, underside 14 includes optional charging plug 12. Charging plug 12 may include recess 212 to provide for form of mating complimentary boss in learning surface, i.e. desktop, and may also include plug mounts 112 for receiving terminal pins (shown later in FIG. 5). Alternatively, an embedded induction plate 13 may respond to induction charging built into desk.

Figure 2:
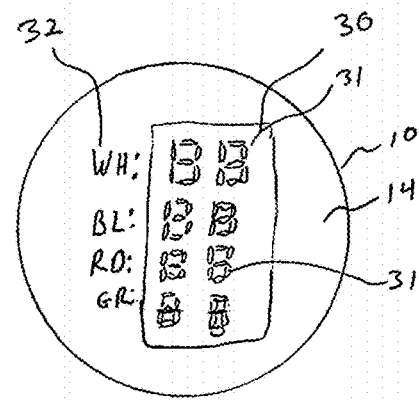
FIG. 2 illustrates an underside of a lighting unit of an embodiment of the present invention.

As shown in FIG. 2, lighting unit 10 lower surface 14 may include indicia and display unit for indicating to each student the specific number of instances of each color unit selected during the day, and/or between resetting of unit. Indicia 32 indicates white, blue, red, green. Display 30 may include LCD 2-digit numeral display such as 31 as shown.

Figure 3:
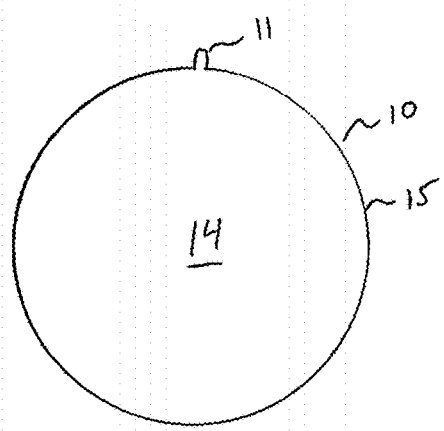
FIG. 3 illustrates an underside of a lighting unit of an embodiment of the present invention.
Figure 5:
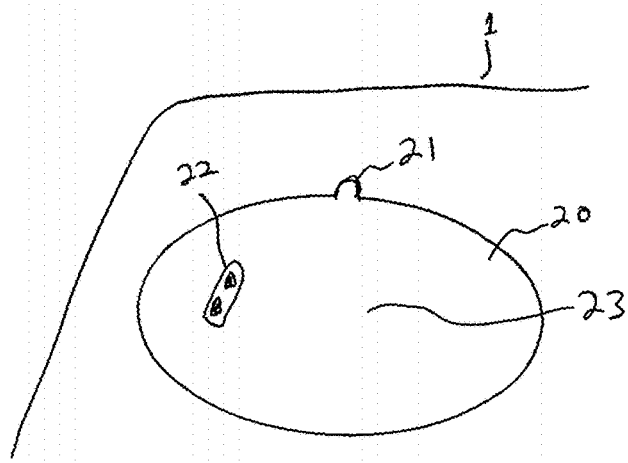
FIG. 5 illustrates a perspective top view of a desktop of an embodiment of the present invention.

As seen in FIG. 3, lighting unit 10 with underside 14 may include a modified edge 15 including specific feature 11 intended to affix a specific orientation of lighting unit on desk. As seen in FIG. 5, desktop 1 includes complimentary recess 20 for receiving the lower portion of lighting unit within receiving indentation 20. Optional induction charger 23 may be provided to charge unit placed thereon. Alternatively, a pinned adaptor 22 may be used to hard plug each in for charging. Specific feature 21 may include an additional recess shape to mate with a complimentary feature on unit bottom.

Figure 4:
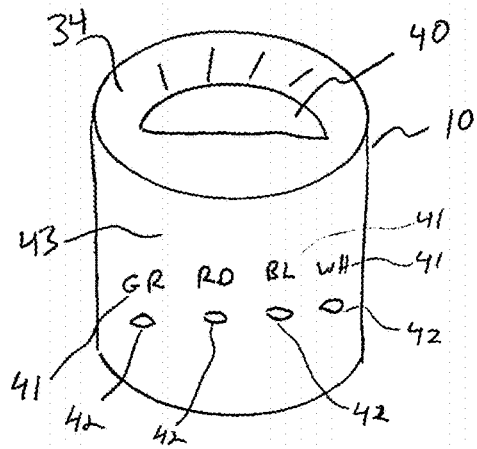
FIG. 4 illustrates a rear perspective view of a lighting unit of an embodiment of the present invention.

Referring to FIG. 4, one embodiment of lighting unit 10 includes indicating light dome 40 on upper surface 34. It is preferred that dome 40 is a translucent or transparent shield covering one or more colored LED lights underneath. Furthermore, in an embodiment, dome may be touch sensitive or spring-loaded to provide for the off switch as discussed above. Back 43 of unit 10 may include buttons 42 for triggering specific colored LED lights as indicated by indicia 41. Pressing one of the buttons will cause a light under dome to illuminate. Holding one of buttons 42 may also provide for a blinking light under dome 40. It is contemplated that the buttons and indicia face student. In an alternative embodiment along the lines of FIG. 4 including the on-unit backside buttons, lighting may be placed on the outer facing vertical wall surface (not shown) as are known in the art. By orienting the unit in a specific manner, lighting may be used on side surfaces.

Figure 6:
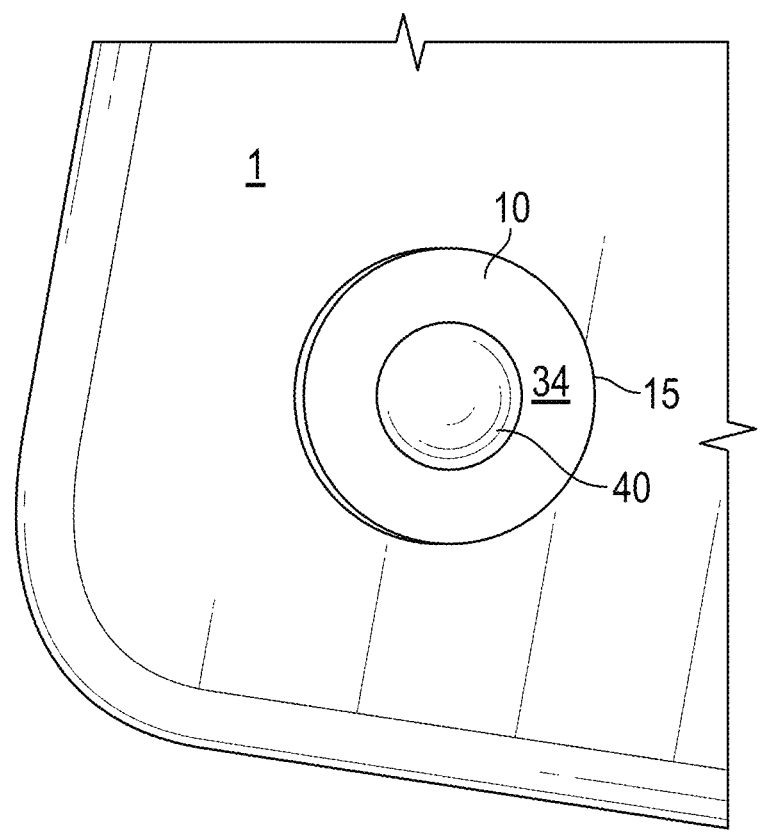
FIG. 6 illustrates a top view of a lighting unit of the present invention.
Figure 7A:
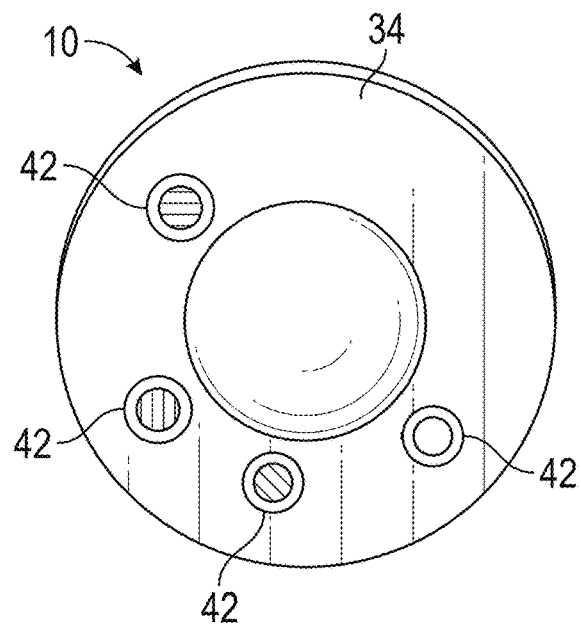
FIG. 7A illustrates a top view of an alternative embodiment of a lighting unit of the present invention.
Figure 7B:
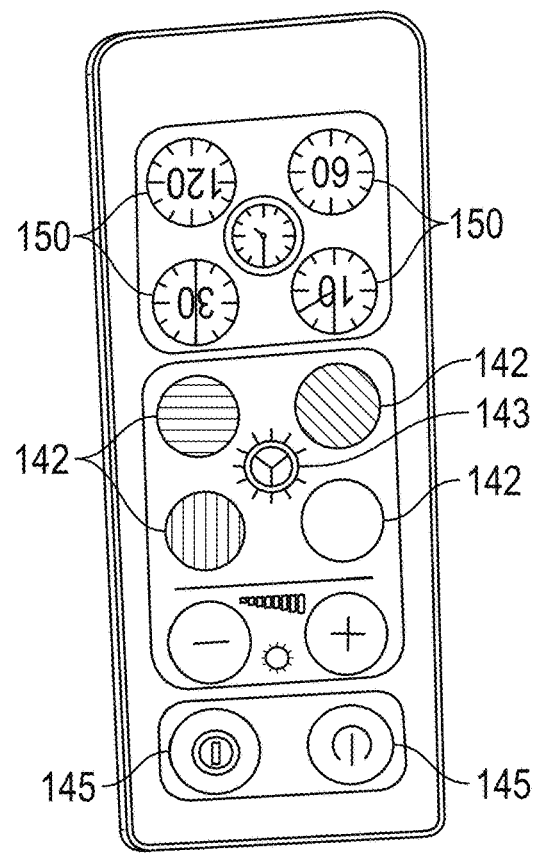
FIG. 7B illustrates a top view of a remote control touch based unit of the present invention.

As seen in FIG. 6, lighting unit is illuminated. As seen in FIG. 7, two alternate methods of causing lighting to appear on unit are shown. In FIG. 7A, buttons 42 may be placed along top surface 34 around dome 40. In such a way, students can activate any color by touching towards the top of the unit. In this embodiment, no specific forward orientation is necessary. In an alternative embodiment, students may press down on lighting dome 40 numerous times to indicate various colors, for instance, one press for blue, a second press for red, a third press for green, a fourth press for white, and a fifth press for off. As seen in FIG. 7B, a remote may be had for each student whereby specific colors may be initiated via remote. Remote shown in FIG. 7B is more preferably used for the teacher lighting unit, and includes buttons 142 for the varied colors, a central button 143 for blinking lights, timing buttons for 10-120 seconds to maintain the light 150, and power switches 145.

Figure 8:
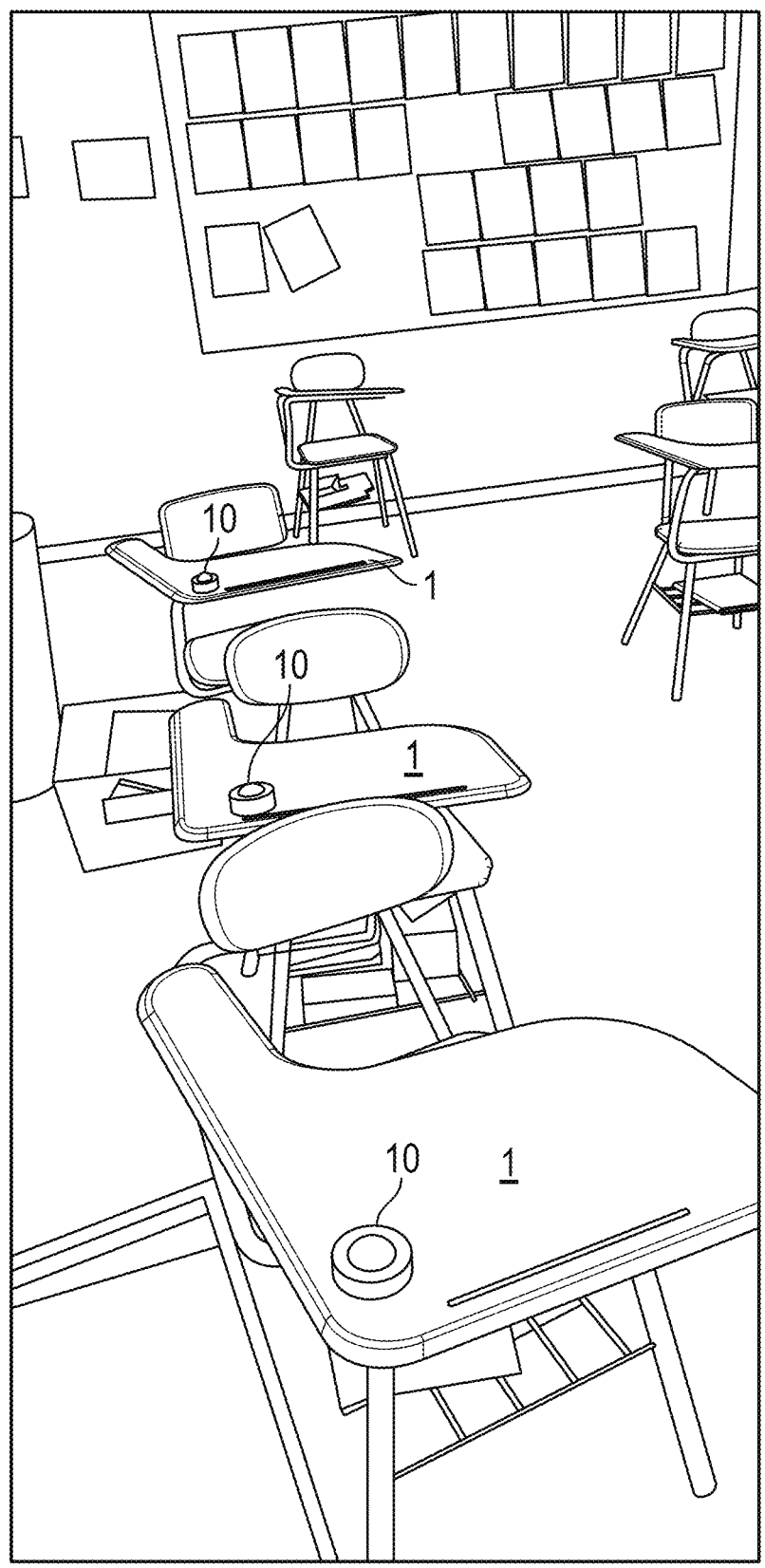
FIG. 8 illustrates a front perspective view of a classroom arrayed with desks.
Figure 9:
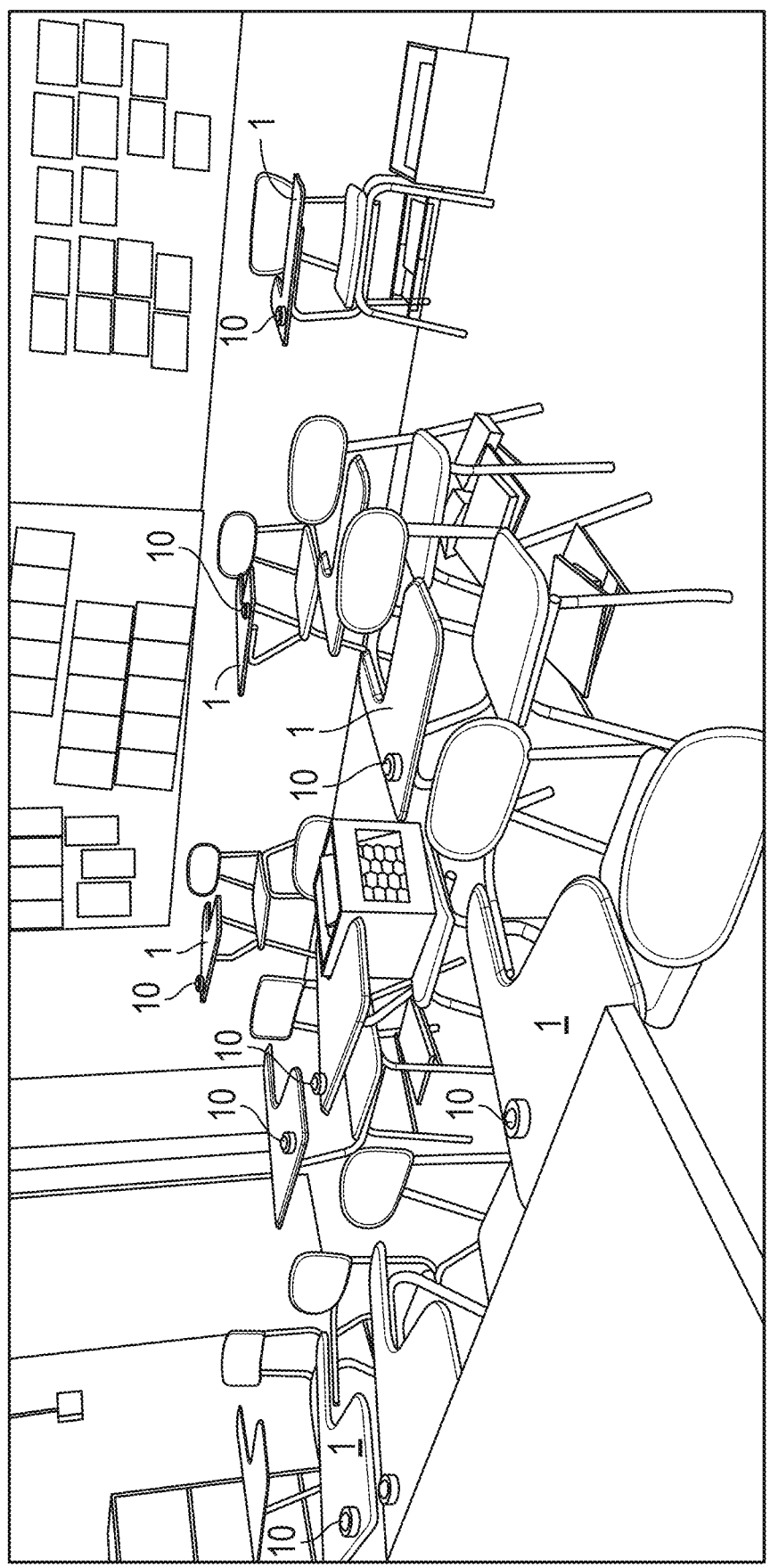
FIG. 9 illustrates a diagonal perspective view of arrayed desks in a classroom.

As seen in FIGS. 8 and 9, student desktops 1 may be outfitted with lighting units 10, wherein desks are arrayed in a typical classroom.

I claim:

1. A method of operating a classroom with a plurality of students at a plurality of desks, and a managerial leader, proctor, or teacher, said method comprising the steps of:
   a. arranging the plurality of desks in the classroom;
   b. mounting a multi-colored light-based communication device on a surface of each of the plurality of desks;
   c. fastening the light-based communication device to the surfaces;
   d. positioning a translucent dome on a top of the light-based communication devices;
   e. a teacher communicating to students orally; and
   f. students responding with at least one of the light-based communication devices, by pushing a select button on the light-based communication device and selecting at least one color of lights indicating the nature of the student response, and activating the selected colored light on the light-based communication device.

2. The method as set forth in claim 1 whereby the step of fastening is accomplished by mounting the light-based communication device into a receiving indentation on a desktop of a student's desk.

3. The method as set forth in claim 1 further comprising the step of recording the nature and frequency of an action in the light-based communication device.

4. The method as set forth in claim 3 further comprising the step of sending a signal from the light-based communication device to a central receiver positioned in the classroom, said central receiver receiving signals from multiple light-based communication devices and separately storing data for each of the light-based communication devices.

5. The method as set forth in claim 1 further comprising the steps of:
   a. whereby said step of teacher communicating comprises the teacher orally proposing a query to the classroom;
   b. whereby said step of students responding comprises one or more students indicating the response by selection of one of four separate colors on the light-based communication device selected from the colors red, blue, green, and white, related to an irrelevant interjection, a request for clarification, a response, and a general question, respectively; and
   c. initiating lighting of the respective of the four separate colors on the light-based communication device.

6. The method as set forth in claim 5 whereby said step of selecting is accomplished by pressing the translucent dome a select number of times to toggle to the chosen color response.

7. The method as set forth in claim 6 further comprising the step of each light-based communication device issuing a signal indicating both a specific unit identity and the nature and a frequency of specific light selections, and transmitting same to a central receiver, said central receiver receiving and storing data from one or more light-based communication devices.

8. The method as set forth in claim 7 further comprising the step of processing data from one or more light based communication devices to provide information, transmitting the information to a teacher terminal and displaying same on said terminal.

9. The method as set forth in claim 2, wherein the receiving indentation is circular, and a lower surface of the light-based communication device is circular and is set in the receiving indentation.

10. The method as set forth in claim 9, wherein the receiving indentation includes a notch, and said step of mounting comprises mating a complimentary feature on the light-based communication device to the notch, and orienting the light-based communication device with the front facing side and display forward towards the teacher, and rear towards the student.

11. The method as set forth in claim 9, wherein the receiving indentation includes a charging surface, and whereby said step of mounting comprises the step of mating the light-based communication device with the charging surface to provide power to the light-based communication device.

12. The method as set forth in claim 9, wherein said light-based communication device comprises a power induction conductor to receive and charge a battery coupled within said light unit, and wherein said surface comprises a charged plate, and whereby said step of mounting comprises placing the conductor over the charged plate to inductively charge or power the light-based-communication device.

13. The method as set forth in claim 1, further comprising the step of mounting a wall-mounted receiver on a classroom wall; said receiver receiving, storing and transponding data signals from at least one of the light-based communication devices.

14. The method as set forth in claim 13, further comprising the step of indicating the status of at least one of the light-based communication devices by lighting a multi-colored light display or clock display on the wall-mounted receiver.

15. The method as set forth in claim 1, further comprising the step of the student pressing the translucent indicating light dome on an upper surface of the light-based communication device to compress a biasing spring to activate or deactivate a light under the dome.

16. The method as set forth in claim 1, further comprising the step of the student holding down one of a plurality of buttons on one of the light-based communication devices to activate a blinking light display on the light-based communication device.

17. The method as set forth in claim 5, further comprising the steps of storing local data on each of the light-based communication devices, positioning an underside display on the underside of each of the light-based communication devices, and tracking the number of times each of the color selections have been made during a session based on the local data on the underside display.

18. The method as set forth in claim 17, whereby said step of positioning includes positioning an LCD display screen with four lines on the underside of the light-based communication device, and said step of tracking comprises utilizing the LCD display screen to show a specific numeral indicating the number of times each of the four colors has been selected during a session.

19. The method as set forth in claim 18, further comprising the step of transmitting the local data from at least one of the light-based communication displays to a central processing unit, and reporting the local data to the teacher.

20. The method as set forth in claim 2, further comprising the steps of:

the teacher proposing a query to the classroom;
one or more students indicating the response by selection of one of four separate colors on the light-based communication device;
initiating lighting of the respective of the four separate colors on the light-based communication device;
whereby the receiving indentation is circular and includes a notch, and a lower surface of the light-based communication device is circular and the device is set in the receiving indentation, said step of mounting comprises mating a complimentary feature on the light-based communication device to the notch, and orienting the light-based communication device with the front facing slide and display forward towards the teacher, and rear towards the student; and whereby the receiving indentation includes a charging surface whereby said step of mounting comprises the step of mating the light-based communication device with the charging surface to provide power to the light-based communication device;
whereby said light-based communication device comprises a power induction conductor to receive and charge a battery coupled within said light unit, and whereby said surface comprises a charged plate, and whereby said step of mounting comprises placing the conductor over the charged plate to inductively charge or power the light-based-communication device; and
storing local data on each of the light-based communication devices, positioning an underside display on the underside of each of the light-based communication devices, tracking the number of times each of the color selections have been made during a session based on the local data on the underside display; whereby said step of positioning includes positioning an LCD display screen with four lines on the underside of the light-based communication device, and said step of tracking comprises utilizing the LCD display screen to show a specific numeral indicating the number of times each of the four colors has been selected during a session.

\* \* \* \* \*